(12) United States Patent
Gugel

(10) Patent No.: US 7,599,115 B2
(45) Date of Patent: Oct. 6, 2009

(54) RASTER MICROSCOPE

(75) Inventor: Hilmar Gugel, Dossenheim (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 259 days.

(21) Appl. No.: 10/570,645

(22) PCT Filed: Aug. 23, 2004

(86) PCT No.: PCT/EP2004/051877

§ 371 (c)(1),
(2), (4) Date: Mar. 3, 2006

(87) PCT Pub. No.: WO2005/024486

PCT Pub. Date: Mar. 17, 2005

(65) Prior Publication Data

US 2007/0053059 A1   Mar. 8, 2007

(30) Foreign Application Priority Data

Sep. 5, 2003   (DE) ................................ 103 40 965

(51) Int. Cl.
*G02B 21/06* (2006.01)
(52) U.S. Cl. ...................................... 359/385; 359/432
(58) Field of Classification Search ....................... None
See application file for complete search history.

(56) References Cited

U.S. PATENT DOCUMENTS

| | | | |
|---|---|---|---|
| 3,437,395 A | 4/1969 | Rosenberger et al. ........... 350/9 |
| 5,140,458 A * | 8/1992 | Takagi et al. ................. 359/380 |
| 5,731,588 A | 3/1998 | Hell et al. ................. 250/458.1 |
| 6,285,019 B1 | 9/2001 | Engelhardt et al. |
| 6,555,826 B2 | 4/2003 | Hoffmann ................. 250/458.1 |
| 6,597,499 B2 * | 7/2003 | Kawano et al. ............ 359/387 |
| 6,667,830 B1 | 12/2003 | Iketaki et al. ............... 359/368 |
| 6,958,470 B2 | 10/2005 | Hoffmann et al. |
| 2002/0104961 A1* | 8/2002 | Hoffman ..................... 250/234 |

(Continued)

FOREIGN PATENT DOCUMENTS

DE   44 16 558   8/1995

(Continued)

OTHER PUBLICATIONS

Int. Search Report for Int. Application Serial No. PCT/EP2004/051877 (3 pages), Nov. 2004.

(Continued)

*Primary Examiner*—Arnel C Lavarias
(74) *Attorney, Agent, or Firm*—Darby & Darby

(57) ABSTRACT

A scanning microscope includes an excitation light beam, a stimulation light beam, an objective, an optical component and an optical system, The excitation light beam optically excites a first area of a specimen. The stimulation light beam triggers a stimulated emission or an additional excitation in a second area of the specimen, the second area at least partially overlapping with the first area of the specimen. The objective focuses the excitation light beam and the stimulation light beam. The optical component influences a shape of the focus of the excitation light beam and/or of the stimulation light beam. The optical system images the optical component into the pupil of the objective and adjusts a size of an image of the optical component.

18 Claims, 2 Drawing Sheets

U.S. PATENT DOCUMENTS

| | | | |
|---|---|---|---|
| 2002/0109913 A1 | 8/2002 | Gugel et al. | 359/387 |
| 2002/0167724 A1 | 11/2002 | Iketaki et al. | 359/385 |

FOREIGN PATENT DOCUMENTS

| | | |
|---|---|---|
| DE | 100 12 462 | 9/2001 |
| DE | 10105391 | 8/2002 |
| EP | 0 491 289 | 6/1992 |
| WO | 9828646 | 7/1998 |

OTHER PUBLICATIONS

M. Dyba et al.: "Focal Spots of Size Lamda/23 Open Far-Field Fluorescence Microscopy at 33nm Axial Resolution", Physical Review Letters, vol. 88, No. 16, Apr. 22, 2002, pp. 163901-1-163901-4.

T.A. Klar et al.: Breaking Abbe's Diffraction Resolution Limit in Fluorescence Microscopy with Stimulated Emission Depletion Beams of Various Shapes, Physical Review E, vol. 64, No. 066613, Nov. 26, 2001, pp. 066613-1-066613-9.

V. Westphal et al.: "Laser-Diode-Stimulated Emission Depletion Microscopy", Applied Physics Letters, vol. 82, No. 18, May 5, 2003, pp. 3125-3127.

T.A. Klar et al.: „Fluorescence Microscopy with Diffraction Resolution Barrier Broken by Stimulated Emission, Proc. Natl. Acad. Sci. U.S.A., vol. 97, No. 15, Jul. 18, 2000, pp. 8206-8210.

\* cited by examiner

RASTER MICROSCOPE

The invention relates to a scanning microscope with an excitation light beam to optically excite a first area of a specimen, with a stimulation light beam to trigger a stimulated emission or an additional excitation in another area of the specimen that at least partially overlaps with the first area of the specimen, comprising at least one objective to focus the excitation light beam and the stimulation light beam and an optical component to influence the shape of the focus of the excitation light beam and/or of the stimulation light beam.

BACKGROUND

In scanning microscopy (raster microscopy), a specimen is illuminated with a light beam so that the reflection light or fluorescent light emitted by the specimen can be observed. The focus of the illuminating light beam is moved in an object plane by means of a controllable beam deflector, generally by tilting two mirrors, whereby the deflection axes are usually positioned perpendicular to each other, so that one mirror deflects in the x-direction while the other deflects in the y-direction. The mirrors are tilted, for example, employing galvanometric actuating elements. The power of the light coming from the object is measured as a function of the position of the scanning beam. Normally, the actuating elements are equipped with sensors to ascertain the actual position of the mirror. Aside from these so-called beam-scanning methods, scanning microscopes with a spatially stationary illuminating light beam are likewise known, in which a fine-positioning stage is used to move the specimen for scanning purposes. These scanning microscopes are known as object-scanning microscopes.

Especially in the field of confocal scanning microscopy, an object is scanned in three dimensions with the focus of a light beam.

A confocal scanning microscope generally comprises a light source, a focusing optical system with which the light from the source is focused onto a pinhole diaphragm (the so-called excitation diaphragm), a beam splitter, a beam deflector to control the beam, a microscope optical system, a detection diaphragm and the detectors for picking up the detection or fluorescent light. The illumination light is coupled in via a beam splitter. Via the beam deflector, the fluorescent or reflection light coming from the object returns to the beam splitter, passes through it and is subsequently focused onto the detection diaphragm behind which the detectors are located. Detection light that does not stem directly from the focus region takes a different light path and does not pass the detection diaphragm, so that point information is obtained that yields a three-dimensional image as a result of the sequential scanning of the object. For the most part, a three-dimensional image is attained by means of layer-by-layer image data acquisition.

German publication DE 44 16 558 discloses an arrangement to increase the resolving power for fluorescence applications. Here, the lateral edge areas of the focus volume of the excitation light beam are illuminated with a light beam having a different wavelength, the so-called stimulation light beam, which is emitted by a second laser, in order for the areas of the specimen excited by the light of the first laser to be returned to their ground state, said areas now having been stimulated. Only the light that is spontaneously emitted from the areas that are not illuminated by the second laser is detected, so that altogether, an improvement in the resolution is achieved. The designation STED (Stimulated Emission Depletion) has been given to this method.

For instance, U.S. patent application 2002/0167724 or U.S. Pat. No. 6,667,830 disclose a variant of the STED technique in which the areas of the specimen excited by the light of the first laser are at first further excited, namely, into a third state, with the light of the second laser. This variant, which has become known by the name "up-conversion", achieves an increase in the resolution in a manner equivalent to the variant involving the directly stimulated depletion into the ground state.

German patent application DE 100 12 462 A1 discloses a device for illuminating an object, preferably in confocal fluorescence scanning microscopy, with an illuminating beam path of a light source and at least one additional illuminating beam path of an additional light source, whereby the illuminating beam paths can be superimposed over each other, at least partially. This device is aimed at simplifying the adjustment as well as reducing the number of optical components in the illuminating beam path and it is characterized in that at least one optical component is arranged in at least one of the illuminating beam paths, whereby the optical properties of the component can be influenced or changed in such a way that the illumination pattern of the illuminating beam path changes its shape in the area of the object. In this context, the optical component can be configured, for instance, as a round phase-retarding plate whose diameter is smaller than the diameter of the beam and that is consequently fully illuminated. The term "phase-retarding plate" is used for an optical component that brings about a location-dependent phase retardation of the light that passes through said phase-retarding plate. The phase-retarding plate is arranged in the beam path of the illuminating beam that triggers a stimulated emission and, with an appropriate structure, generates a hollow focus that allows an improvement in the resolution, both laterally and axially. A preferred embodiment of a phase-retarding plate consists of a substrate onto which one or more layers of a phase-retarding material (for example, $MgF_2$) are applied locally in certain areas. If the thickness of the layers and the size of the layer areas are selected in such a way that half of the total light amplitude in the pupil of the microscope optical system has a phase retardation of $\lambda/2$ relative to the other half of the light amplitude, then the focused wave front generates destructive interference in the focus of the microscope optical system (objective). The resultant PSF (Point Spread Function) thus has a minimum of the focus center.

The use of phase-retarding plates in STED microscopy is also cited, for example, in the following publications: Proc. Natl. Acad. Sci. U.S.A., Vol. 97, p. 8206 to 8210, 2000; Appl. Phys. Lett., Vol. 82, No. 18, p. 3125 to 3127, 2003; Phys. Rev. Lett., Vol. 88, p. 163901-1 to 163901-4, 2002; Phys. Rev. E, Vol. 64, p. 066613-1 to 066613-9, 2001.

Instead of conventional phase-retarding plates, it is also possible to employ LCDs or programmable light modulators.

A resolution increase in the direction of the optical axis can be achieved by means of a double-objective array (4Pi-array) in the manner described in European patent specification EP 0 491 289 bearing the title: "Doppelkonfokales Rastermikroskop" ["Double confocal scanning microscope"]. The excitation light coming from the illumination system is split into two partial beams that simultaneously illuminate the specimen from opposite directions through two mirror-symmetrical objectives. The two objectives are arranged on different sides of the object plane they share. As a result of this interferometric illumination, an interference pattern having a main maximum and several secondary maxima is formed in the object point in the case of constructive interference. If only the light of the excitation interferes, one speaks of 4Pi microscopy of Type A, while Type C refers to simultaneous interference of the detection light. Owing to the interferometric illumination, a higher axial resolution can be achieved with this double confocal scanning microscope than with a conventional scanning microscope.

The combination of STED and a double confocal array permits both a lateral and an axial improvement of the resolution.

In a special combination of an STED and a double confocal array, namely, the STED-4Pi microscope, a double confocal array of the stimulation light beam serves to generate a destructive interference in the focus center. Consequently, a stimulated depletion is restricted to the axial focus edge (Phys. Rev. Lett., Vol. 88, p. 1639901-1 to 163901-4, 2002).

It has been found that, in order to achieve the best possible resolving power, the optical component has to be positioned and adjusted very precisely, preferably in the beam path of the stimulation light beam. A drawback of this approach is that the optical component has to be readjusted and adapted to the structural and optical properties of the new objective every time the objective is changed.

SUMMARY OF THE INVENTION

Therefore, it is an object of the present invention to provide a scanning microscope with which a theoretically possible degree of resolution can be achieved with considerably reduced adjustment requirements and which concurrently offers a simplified adaptation to changing examination conditions, for instance, the changing of objectives.

The present invention provides a scanning microscope in which an optical system for imaging the optical component into the pupil of the objective is provided, whereby the size of the image of the optical component can be adjusted.

The invention entails the advantage that at least one optical system is provided that images the optical component into the pupil of the objective, whereby the size of the image of the optical component can be adjusted.

It has been recognized according to the invention that, in order to attain an exact manipulation of the wave front of the excitation light beam or of the stimulation light beam, the optical component has to be arranged in the pupil of the objective or in a plane that is conjugated thereto. Preferably, the optical component acts exclusively on the stimulation light beam and not on the excitation light beam. Since, as a rule, the stimulation light beam and the excitation light beam are combined upstream from the objective, for example, by means of a dichroitic beam splitter, the optical component is preferably arranged upstream from the beam recombiner in the beam path of the stimulation light beam.

For example, a retarding plate configured as a phase-retarding plate can be used as the optical component. In actual practice, owing to manufacturing tolerances, phase-retarding plates exhibit deviations from the ideal geometrical shape. For instance, the radii of a λ/2-plate, like the ones used in the above-mentioned publication (Proc. Natl. Acad. Sci. U.S.A., Vol. 97, p. 8206 to 8210, 2000), do not match the nominal radii. In order to nevertheless attain the desired wave front in the pupil, according to the invention, the size of the image of the optical component in the pupil is adapted.

In a preferred embodiment, the optical system that images the optical component into the pupil of the objective has movable focusing means such as, for example, lenses or concave mirrors. In another variant, the component itself is arranged so as to be movable preferably along the optical axis. In a particularly preferred embodiment, the optical system has movable focusing means and the component itself can be arranged so as to be movable preferably along the optical axis.

Advantageously, a motor drive is provided for moving the optical system or the optical component. The focusing means and/or the optical component is/are preferably moved in such a way that the image of the optical component remains in the pupil of the objective at all times and that the excitation light beam or the stimulation light beam illuminates the objective as a parallel bundle of rays.

In another preferred variant, the optical system is preferably configured as a varifocal optical system that can be adjusted using a motor. This can be employed, on the one hand, to adjust the system or, on the other hand, to adapt the size of the image of the optical component to various pupil diameters, for instance, of different objectives.

The varifocal optical system is configured in such a way that, when its focal length is changed, the focal point located on the side of the varifocal optical system that lies across from the component that is to be imaged into the pupil remains stationary. In an especially preferred embodiment of the varifocal optical system, both focal points of the varifocal optical system remain stationary when the focal length is changed.

Instead of the above-mentioned possibilities for adjusting the size of the image of the optical component, it can also be provided that the optical system is replaced by an optical system having other optical properties. To this end, a supply means, which is preferably configured as a turret or a sliding carriage and which stores the various optical systems, is provided so that the optical systems can be placed into the beam path of the excitation or stimulation light beam simply by turning or sliding the supply means. Preferably, the supply means is driven by a motor.

In a preferred embodiment, the size of the image of the optical component is adjusted automatically. Preferably, a means is provided that automatically recognizes the objective placed into the beam path, thus allowing a control computer to perform the adjustment—which has optionally been stored ahead of time—that is optimal for this objective. Preferably, the size of the image of the optical component is adjusted as a function of the diameter of the pupil of the selected objective.

In a preferred embodiment, the scanning microscope is configured as a confocal or double confocal scanning microscope.

The pupil plane is a Fourier plane relative to the focus plane of the objective and, in a preferred variant, the optical system generates another Fourier plane in which the optical component is arranged.

BRIEF DESCRIPTION OF THE DRAWINGS

The subject matter of the invention is schematically depicted in the drawing and described below with reference to the figures. These show the following.

DETAILED DESCRIPTION

Figure 1:
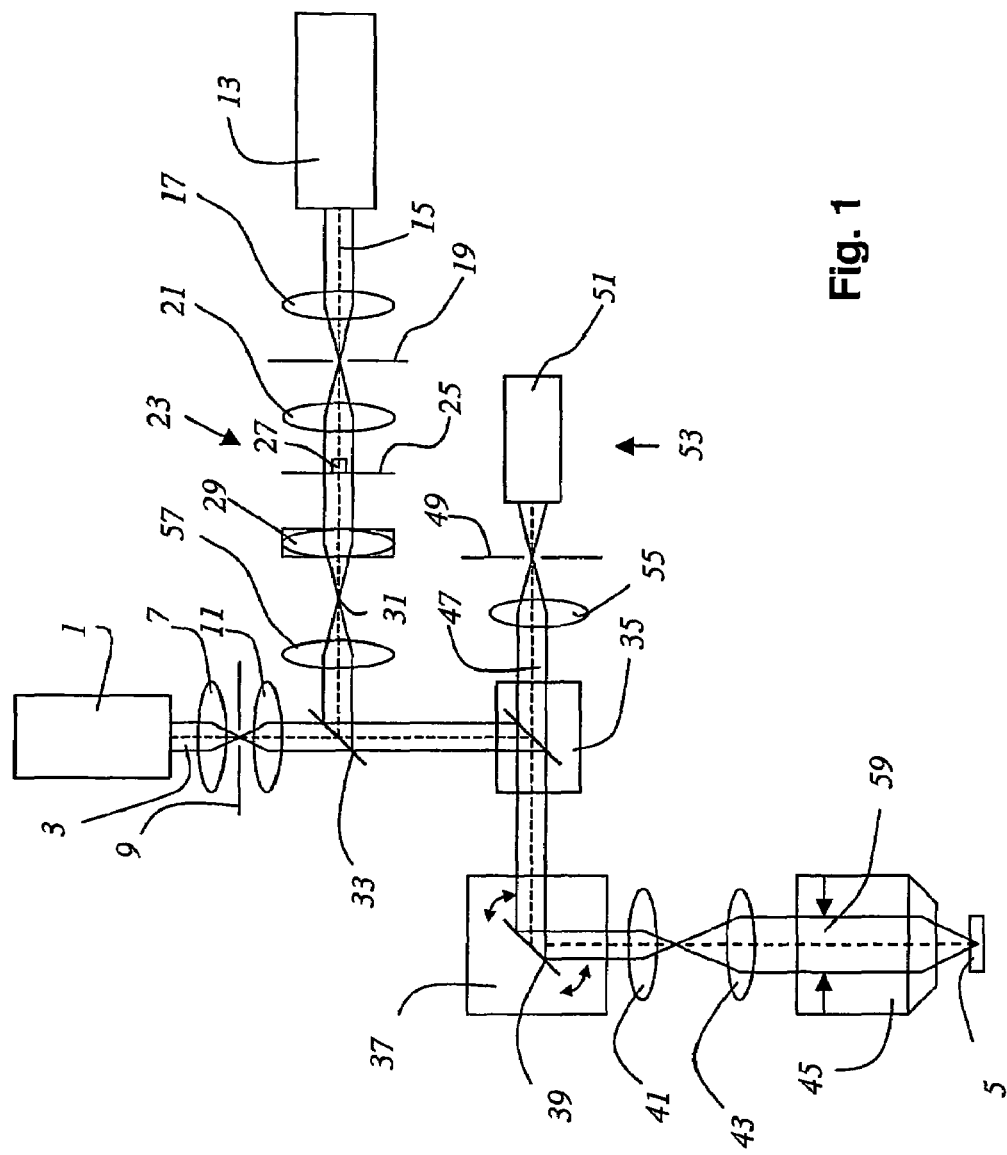
FIG. 1—a scanning microscope according to the invention.

FIG. 1 shows a scanning microscope according to the invention that is configured as a confocal scanning microscope. The scanning microscope comprises a first light source 1 that emits an excitation light beam 3 to optically excite a first area of a specimen 5. The excitation light beam 3 is focused with the optical system 7 onto the illumination pinhole diaphragm 9, it passes through the latter and is subsequently collimated by the next optical system 11. The scanning microscope comprises another light source 13 that generates a stimulation light beam 15 that is focused onto the stimulation pinhole diaphragm 19 with the lens 17. The stimulation light beam 15 that passes through the stimulation pinhole diaphragm 19 is collimated by the next lens 21 and subsequently passes through an optical component 23 for purposes of influencing the shape of the focus of the stimulation light beam 15. The optical component 23 consists of a substrate 25 onto which a phase-retardation plate 27 is applied that is configured as a λ/2-plate and that has a smaller diameter than the diameter of the stimulation light beam 15. A varifocal optical system 29 focuses the stimulation light beam 15 that passes through the optical component 23 to a focus 31. The varifocal optical system 29 is configured in such a way that the location of the focus 31 remains constant, so that, if applicable, only the optical component needs to be readjusted. The varifocal optical system 29 in this scanning microscope is configured in such a manner that the position of its front focal plane in which the focus 31 is located and the position of the rear focal plane in which the optical component is arranged remain constant at all times in order to avoid the need for a readjustment of the optical component in the axial direction. The excitation light beam 3 and the stimulation light beam 15 are combined employing a dichroitic beam splitter 33 and then deflected via the main beam splitter 35 to a beam deflector 37 that comprises a gimbal-mounted scanning mirror 39. The beam deflector 37 guides the excitation light beam 3 and the stimulation light beam 15 jointly through the scanning optical system 41, the tube optical system 43 and through the objective 45 or through the specimen. In the area of the specimen, the focuses of the excitation light beam and of the stimulation light beam overlap partially for purposes of attaining the STED effect. The detection light 47 coming from the specimen travels through the objective 45, the tube optical system 43, the scanning optical system 41 and then, via the beam deflector 37, back to the main beam splitter 35, then it passes through the latter and subsequently, after passing through the detection pinhole diaphragm 49, it reaches the detector 53 that is configured as a photomultiplier 51. A focusing optical system 55 is provided in order to focus the detection light 47 onto the detection pinhole diaphragm 49. The varifocal optical system 29 arranged between the optical component 23 and the focus 31, as well as the lens 57 arranged between the focus 31 and the dichroitic beam splitter 33, together with the scanning optical system 41 and the tube optical system 43, form an optical system that images the optical component 23 into the pupil 59 of the objective 45. The size of the image of the optical component can be adjusted with the varifocal optical system 29. In this context, it is apparent to the person skilled in the art that, during normal operation of the scanning microscope, no real visible image of the optical component exists in the pupil 59 of the objective 45.

Figure 2:
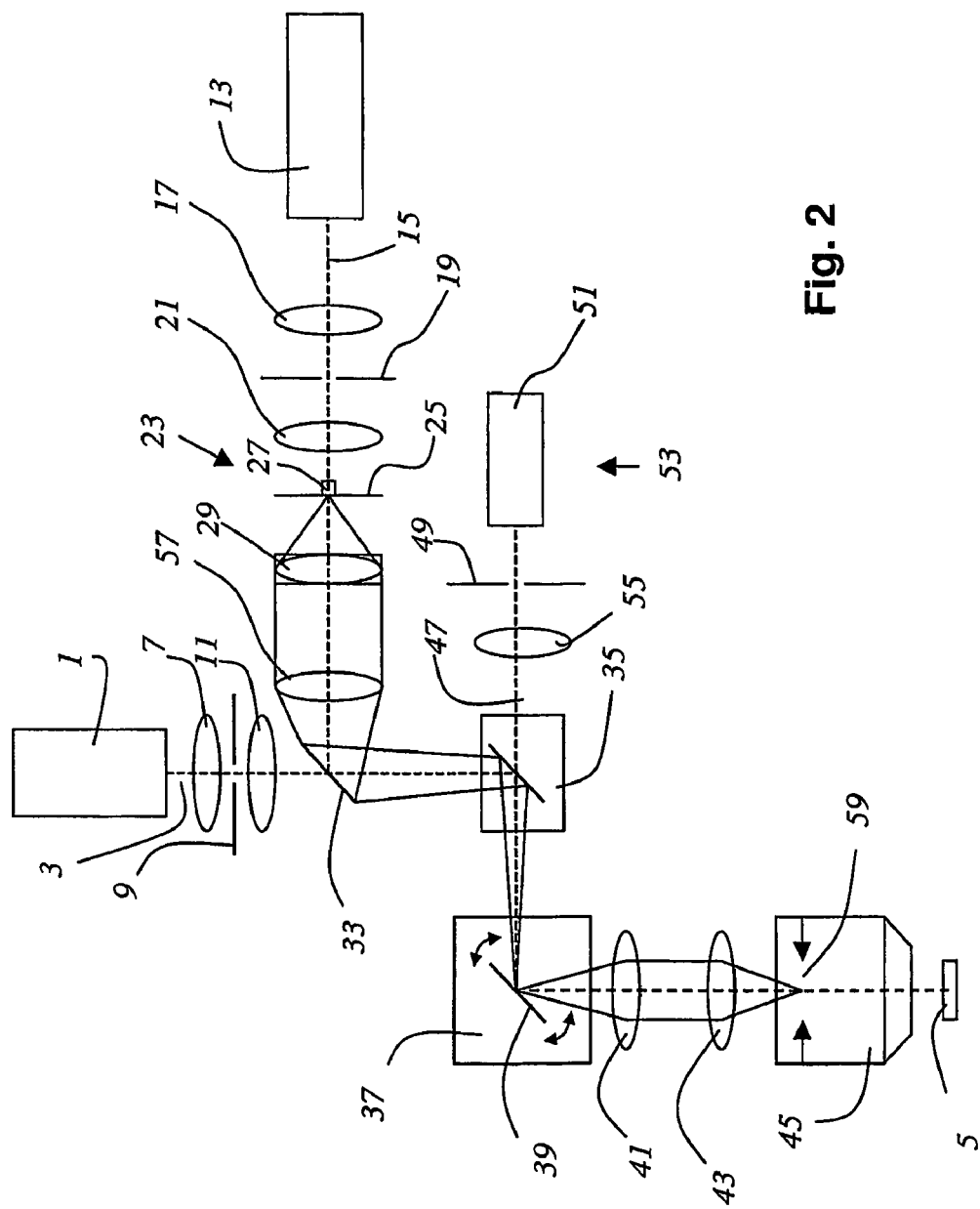
FIG. 2—a schematic depiction of the imaging of the optical component into the pupil of the objective.

FIG. 2 illustrates how the optical system made up of the varifocal optical system 29, the lens 57, the scanning optical system 41 and the tube optical system 43 focuses the optical component into the pupil of the objective. This figure shows a schematic illustration of a beam path (solid lines) that is not present during the normal operation of the scanning microscope. Rather, this is a Fourier beam path of the type also normally found, for example, in technical drawings employed to illustrate Köhler illumination.

The invention has been described with reference to an embodiment. However, it goes without saying that changes and modifications can be made without departing from the protective scope of the claims presented below.

List of Reference Numerals
1 light source
3 excitation light beam
5 specimen
7 optical system
9 illumination pinhole diaphragm
11 next optical system
13 next light source
15 stimulation light beam
17 lens
19 stimulation pinhole diaphragm
21 lens
23 optical component
25 substrate
27 phase-retardation plate
29 varifocal optical system
31 focus
33 beam splitter
35 main beam splitter
37 beam deflector
39 scanning mirror
41 scanning optical system
43 tube optical system
45 objective
47 detection light
49 detection pinhole diaphragm
51 photomultiplier
53 detector
55 focusing optical system
57 lens
59 pupil

What is claimed is:

1. A scanning microscope comprising:
   an excitation light beam configured to optically excite a first area of a specimen;
   a stimulation light beam configured to trigger a stimulated emission or an additional excitation in a second area of the specimen, the second area at least partially overlapping with the first area of the specimen;
   an objective configured to focus the excitation light beam and the stimulation light beam;
   an optical component configured to influence a shape of a focus of at least one of the excitation light beam and the stimulation light beam; and
   an optical system configured to image the optical component into a pupil of the objective and to adjust a size of an image of the optical component while maintaining the image of the optical component in the pupil of the objective.

2. The scanning microscope as recited in claim 1 wherein the optical system includes a movable focusing device.

3. The scanning microscope as recited in claim 1 wherein the optical component is movably disposed.

4. The scanning microscope as recited in claim 1 further comprising a motor configured to move at least one of the optical system and the optical component.

5. The scanning microscope as recited in claim 1 the optical system includes a varifocal optical system.

6. The scanning microscope as recited in claim 5 further comprising a motor configured to adjust the varifocal optical system.

7. The scanning microscope as recited in claim 1 wherein the optical system is replaceable.

8. The scanning microscope as recited in claim 7 further comprising a supply device configured to store a second optical system having a different optical property than the optical system.

9. The scanning microscope as recited in claim 8 wherein the supply device includes at least one of a turret and a sliding carriage.

10. The scanning microscope as recited in claim 8 further comprising a motor configured to drive the supply device.

11. The scanning microscope as recited in claim 9 further comprising a motor configured to drive the supply device.

12. The scanning microscope as recited in claim 1 wherein the optical system is configured to automatically adjust the size of the image of the optical component.

13. The scanning microscope as recited in claim 1 wherein the optical system is configured to adjust the size of the image of the optical component as a function of a diameter of the pupil of the objective.

14. The scanning microscope as recited in claim 1 wherein the optical component includes a phase-retarding plate.

15. The scanning microscope as recited in claim 14 wherein the phase-retarding plate includes a $\lambda/2$ plate.

16. The scanning microscope as recited in claim 14 wherein the phase-retarding plate is configured to achieve locally differing phase retardations in different areas.

17. The scanning microscope as recited in claim 1 wherein the optical component is configured to act exclusively on the stimulation light beam.

18. The scanning microscope as recited in claim 1 wherein the scanning microscope is at least one of a confocal scanning microscope and a double confocal scanning microscope.

* * * * *